United States Patent [19]
Koch et al.

[11] Patent Number: 6,041,813
[45] Date of Patent: Mar. 28, 2000

[54] MANUALLY ACTUATED DIAPHRAGM VALVE WITH LOCKOUT FEATURE FOR OPEN AND CLOSED POSITIONS

[75] Inventors: Ulrich H. Koch, Chagrin Falls; Andrew M. Dougherty, Solon; Brian K. Sprafka, Euclid, all of Ohio

[73] Assignee: Swagelok Marketing Co., Solon, Ohio

[21] Appl. No.: 09/050,812

[22] Filed: Mar. 30, 1998

Related U.S. Application Data

[60] Provisional application No. 60/042,180, Apr. 2, 1997, and provisional application No. 60/079,437, Mar. 26, 1998.

[51] Int. Cl.7 ................................................ F16K 35/00
[52] U.S. Cl. ........................................ 137/383; 137/556
[58] Field of Search .................................. 137/383, 556

[56] References Cited

U.S. PATENT DOCUMENTS

| | | | |
|---|---|---|---|
| D. 160,365 | 10/1950 | Brumbaugh | 137/553 |
| 1,683,649 | 9/1928 | Belote . | |
| 1,984,510 | 12/1934 | Allen et al. | 137/553 |
| 2,025,431 | 12/1935 | Barnes | 137/383 |
| 2,592,816 | 4/1952 | Mapes . | |
| 2,661,765 | 12/1953 | Troy . | |
| 3,504,694 | 4/1970 | Noland | 137/383 |
| 4,208,033 | 6/1980 | Kesterman . | |
| 5,131,627 | 7/1992 | Kolenc . | |

FOREIGN PATENT DOCUMENTS

| | | |
|---|---|---|
| 0347289 A1 | of 0000 | European Pat. Off. . |
| 1 106 309 | of 0000 | France . |
| 88 02 076 | of 0000 | Germany . |

OTHER PUBLICATIONS

Attached Exhibit A consisting of 5 views of a design for a toggle valve 1995.
Attached Exhibit B consisting of a facsimile cover sheet, 1995.
Attached Exhibit C consisting of 3 pages of drawings of a design for a toggle valve 1995.

*Primary Examiner*—A. Michael Chambers
*Attorney, Agent, or Firm*—Calfee, Halter & Griswold LLP

[57] ABSTRACT

A manually actuated valve comprising a valve casing having an inlet and an outlet, and an actuator having an open position wherein the inlet and outlet are connected and a closed position wherein the inlet and the outlet are isolated. The valve has a handle movable between a first position and a second position, the handle controlling operation of the actuator. The valve further includes a member on the valve casing for receiving a locking member that maintains the handle in at least one of the first position and second position.

22 Claims, 14 Drawing Sheets

MANUALLY ACTUATED DIAPHRAGM VALVE WITH LOCKOUT FEATURE FOR OPEN AND CLOSED POSITIONS

This application claims priority to U.S. Provisional Application Ser. No. 60/042,180, filed Apr. 2, 1997, and U.S. Provisional Application Ser. No. 60/079,437, filed Mar. 26, 1998.

BACKGROUND OF THE INVENTION

This invention pertains to the valve art, and more particularly to a diaphragm valve of the type used in fluid systems requiring high purity and high reliability.

The assignee of the present invention previously developed a related diaphragm valve as shown and described in detail in U.S. Pat. No. 5,131,627, herein incorporated by reference. That patent discloses a valve assembly that controls flow between inlet and outlet passages that selectively communicate with a valve chamber. A diaphragm is selectively brought into sealing engagement with a valve seat via an actuating stem. The embodiment shown in the drawings of the '627 patent discloses an air actuated valve that reciprocates the stem between open and closed positions.

In selected situations, however, a manually actuated version is desired. The details of this invention are particularly directed to a manually actuated diaphragm valve of this type. It is important to convey to the operator whether the valve is in an open or closed position. Moreover, it may be necessary or advantageous to lock the valve in either its open or closed position, or both positions. It is these features that are particularly addressed in the subject invention.

Other features and advantages of the invention will become apparent from the following detailed description, with reference to the accompanying drawing and claims, which form a part of the specification.

DETAILED DESCRIPTION

Figure 1:
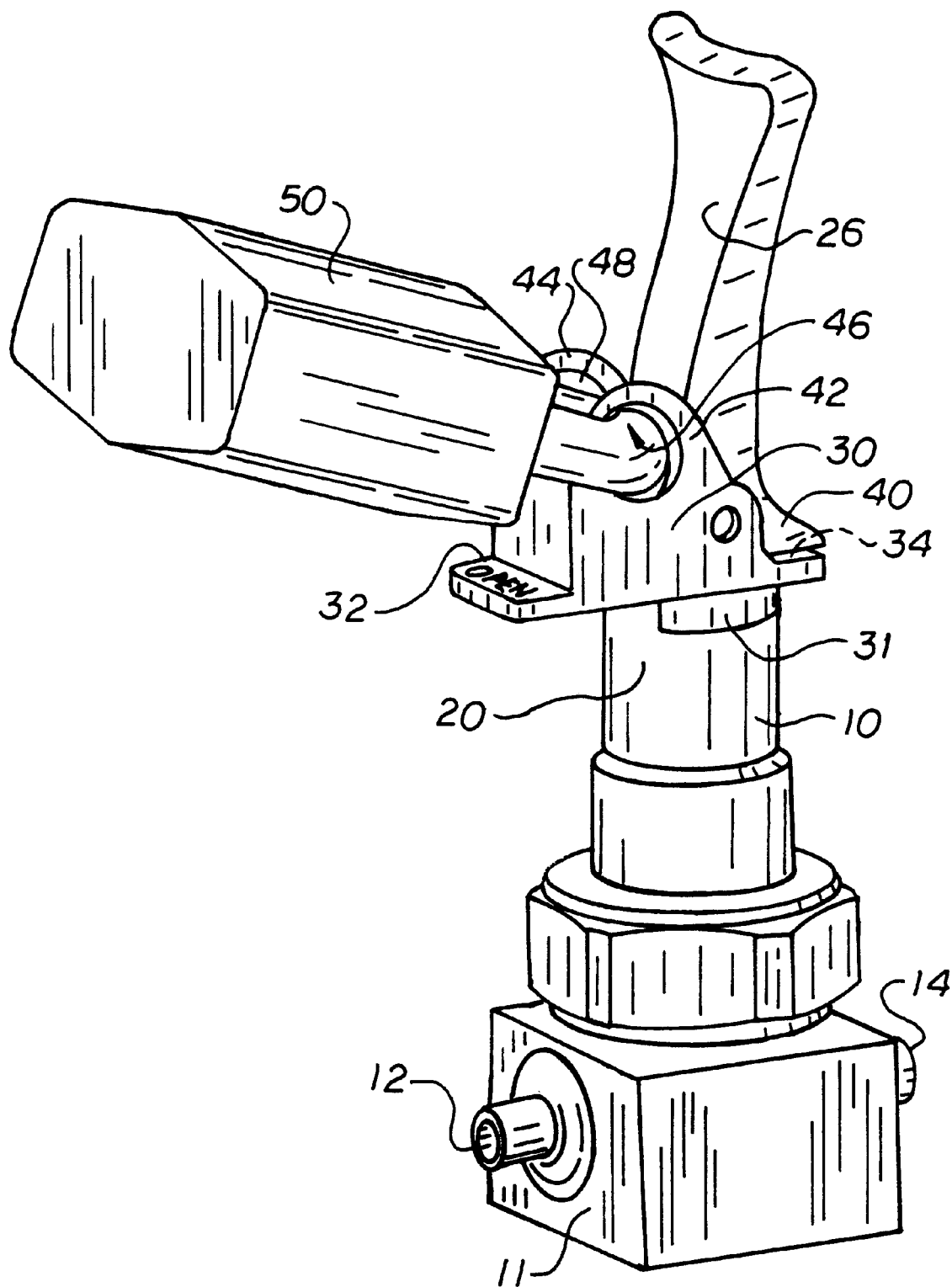
FIG. 1 is a perspective view of the manually actuated diaphragm valve of the present invention, shown locked in the open position with a padlock.
Figure 2:
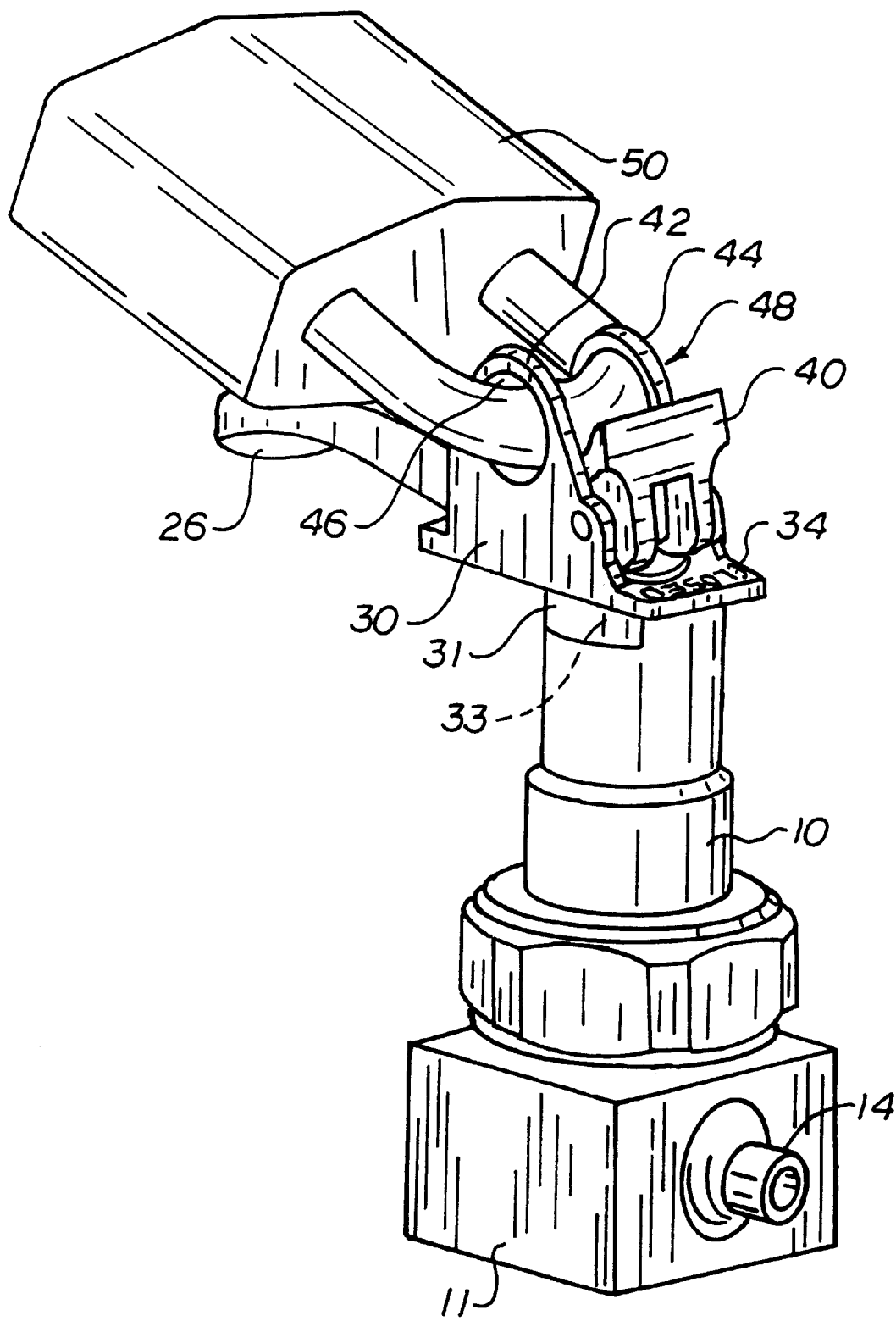
FIG. 2 is a perspective view of the valve of FIG. 1, shown locked in the closed position with a padlock.
Figure 17:
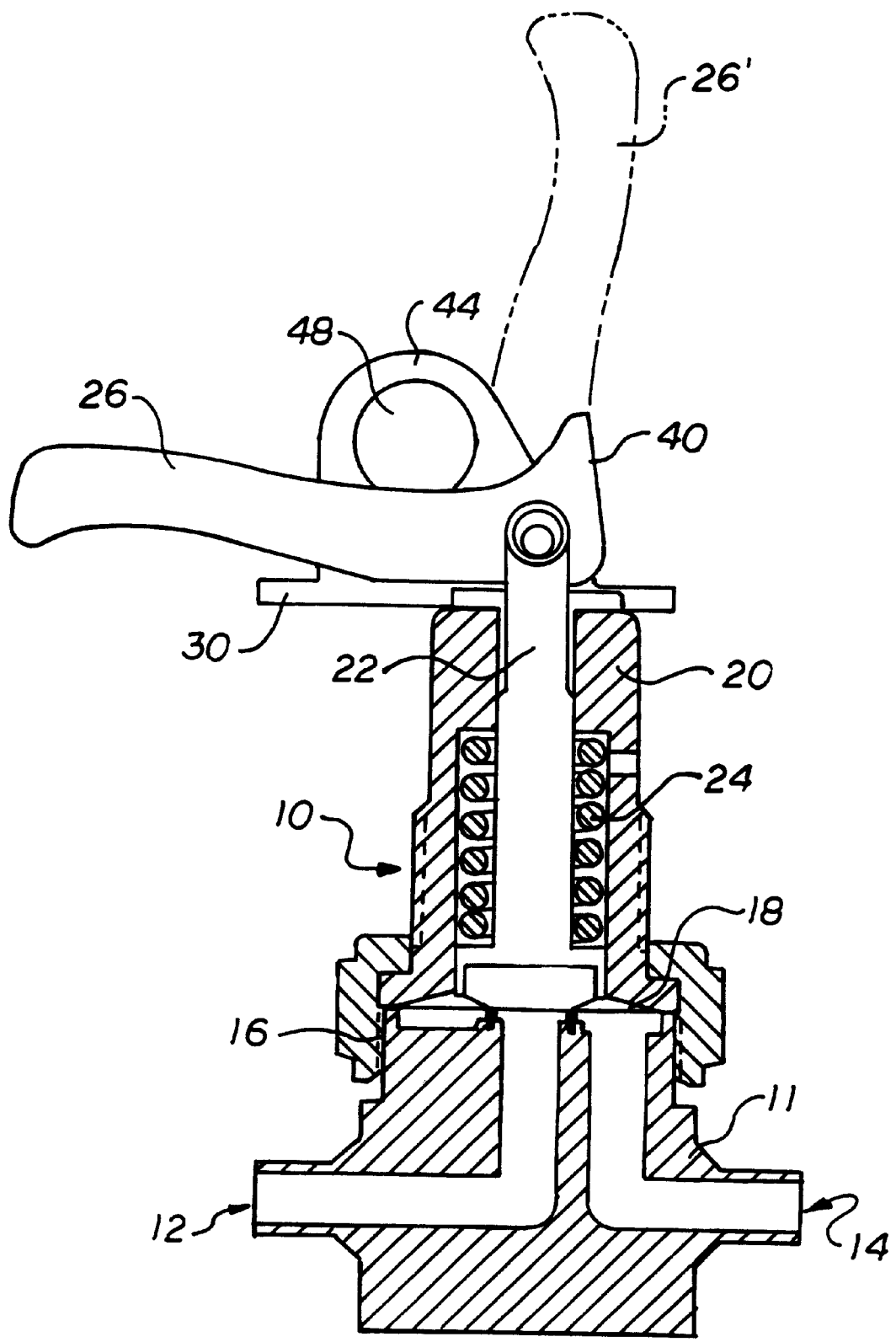
FIG. 17 is a side elevational view, in partial cross-section, of the valve of FIG. 2 shown in the closed position with the open position of the actuating handle shown in phantom.

Referring to FIGS. 1, 2, and 17, the subject new valve includes valve body 11 having an inlet 12 and outlet 14 that communicate with a valve chamber 16. Outer casing 10 includes a bonnet 20 and the valve body 11. A diaphragm 18 is sealed about its periphery between the valve body and the bonnet 20. The bonnet has a throughbore that receives an actuating stem, or actuator, 22 and a biasing spring 24 that urges the actuator 22, and thus the diaphragm 18, toward a closed position. The actuator 22 is pivotally secured to actuating handle 26. When the handle 26 is in the first, or closed position, the actuator impedes communication between the inlet 12 and outlet 14. When the handle 26 is in the second, or open, position, the actuator allows communications between the inlet 12 and the outlet 14. The handle is shown in its open position, in broken lines, as handle 26' in FIG. 17. In a preferred embodiment, the handle 26 is axially rotated in a vertical plane through substantially 90° between its open and closed positions. Further preferably, the handle is generally horizontal when in the closed position and generally vertical when in the open position. However, the valve may be modified such that nearly any orientation or angle may correspond to the open position and a different orientation or angle may correspond to the closed position without departing from the scope of the present invention.

Figure 3:
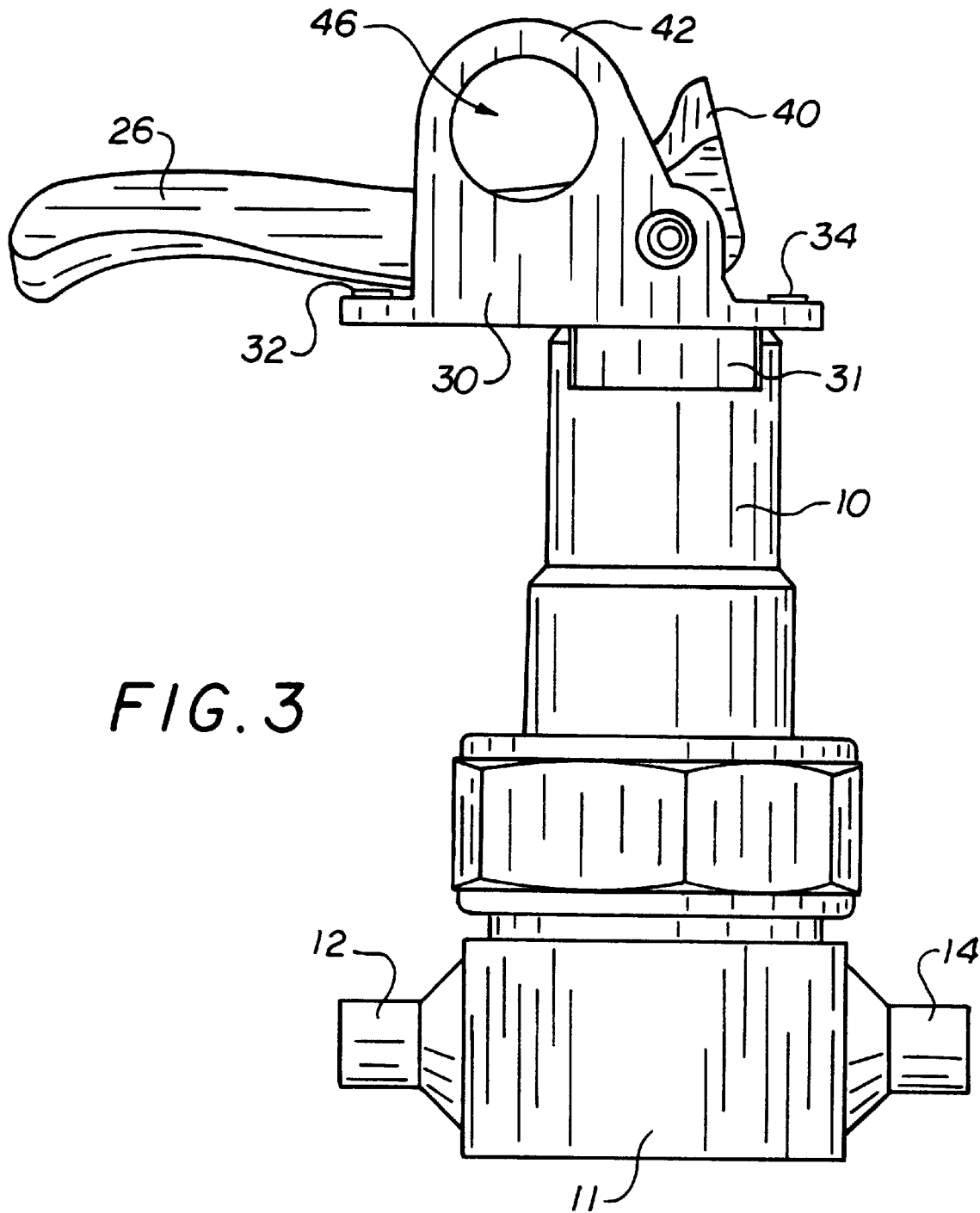
FIG. 3 is a left side view of the valve of FIG. 2.

Additionally, a bracket, or member, 30 is received around the bonnet. The bracket includes indicia 32, 34 representative of the open and closed positions, respectively, of the handle. The bracket or member 30 may either be separate from, or integral with, the casing 10. The open indicia 32 and closed indicia 34 may consist of any symbols, drawings, text or the like, or combinations thereof, which serve to communicate the position of the handle 26 or actuator 22. For example, FIG. 1 illustrates the handle in an upright or open position. A lower flange 40 of the handle covers the closed indicia in this position of the handle. Thus it is quickly evident to an operator that the valve is in the open position allowing fluid communication between the inlet 12 and outlet 14. Moreover, the bracket 30 includes a pair of spaced flanges 42, 44 having respective openings 46, 48 to receive a locking member. The locking member may include any structural member which impedes the rotation of the handle 26 from the open position to the closed position, or vice versa. For example, a structural member passed through the openings 46, 48 may serve as the locking member. Furthermore, a single locking member may be used to lock multiple valves. A bar, flexible cable, chain or the like may be passed through the openings 46, 48 of multiple valves to retain each handle in the open or the closed position. In a preferred embodiment, a padlock 50 is used to lock a single valve. When the padlock 50 is positioned in place as shown in FIG. 1, the handle 26 is maintained in its open position and cannot be inadvertently moved to the closed position. Only upon removal of the lock 50 can the handle be rotated to the closed position shown in FIG. 3.

Figure 7:
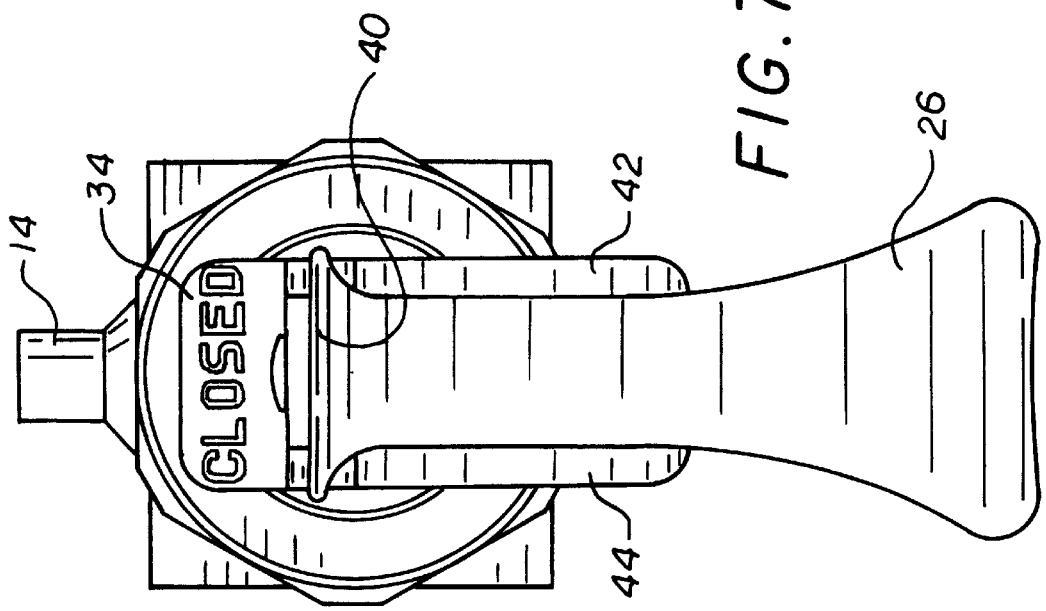
FIG. 7 is a top plan view of the valve of FIG. 2.

When rotated to the closed position, the handle covers the open indicia 32 and reveals the closed indicia 34. Moreover, and as evident in FIG. 2, the lock can be received in the flange openings 46, 48 to maintain the handle in its closed position. The closed position is more particularly illustrated in FIG. 7. An intermediate portion of the handle is received between the flanges of the bracket. Thus the handle 26 covers the open indicia 32 and the flange 40 at the lower end of the handle is disposed upright so as to reveal the closed indicia 34.

Figure 4:
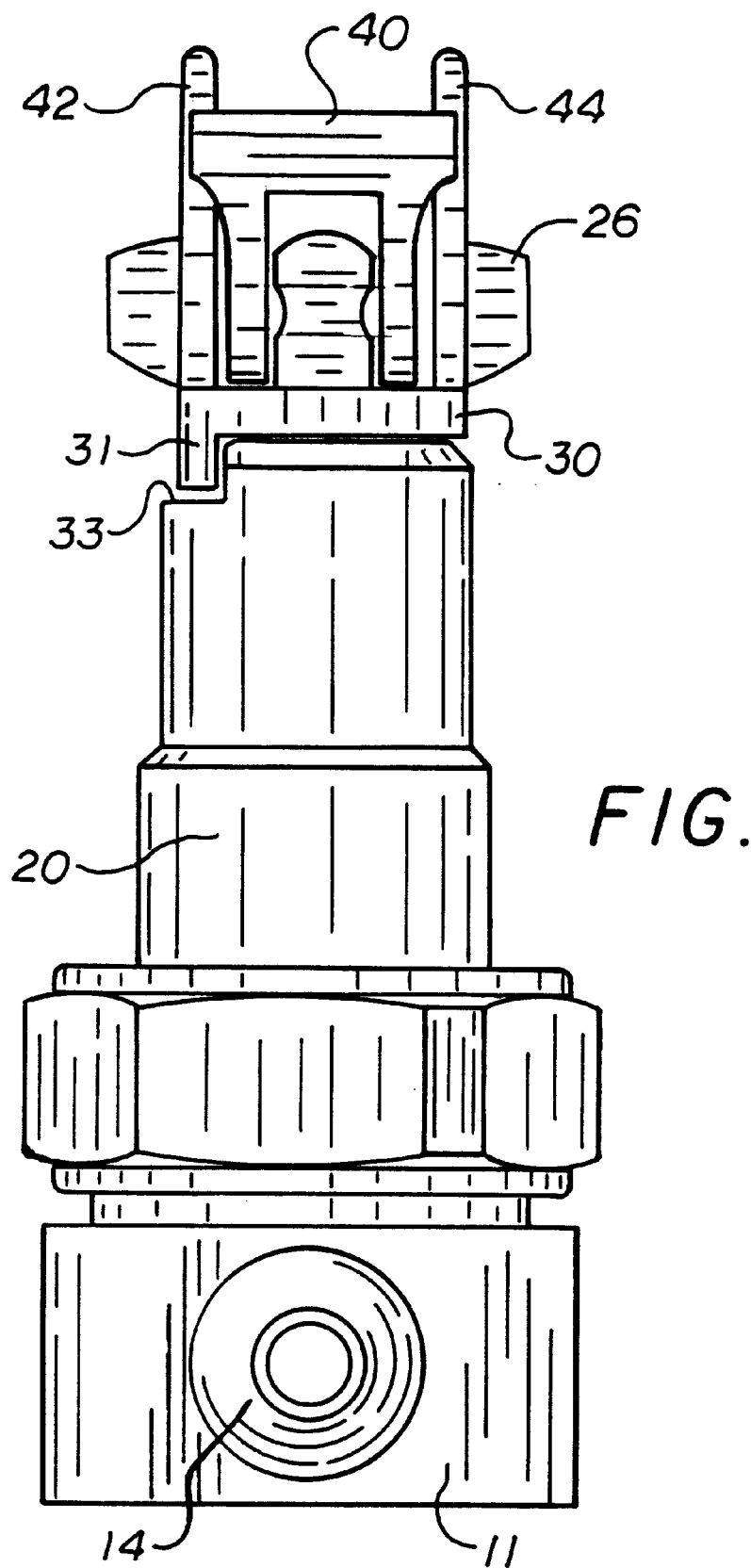
FIG. 4 is a front end view of the valve of FIG. 2.
Figure 5:
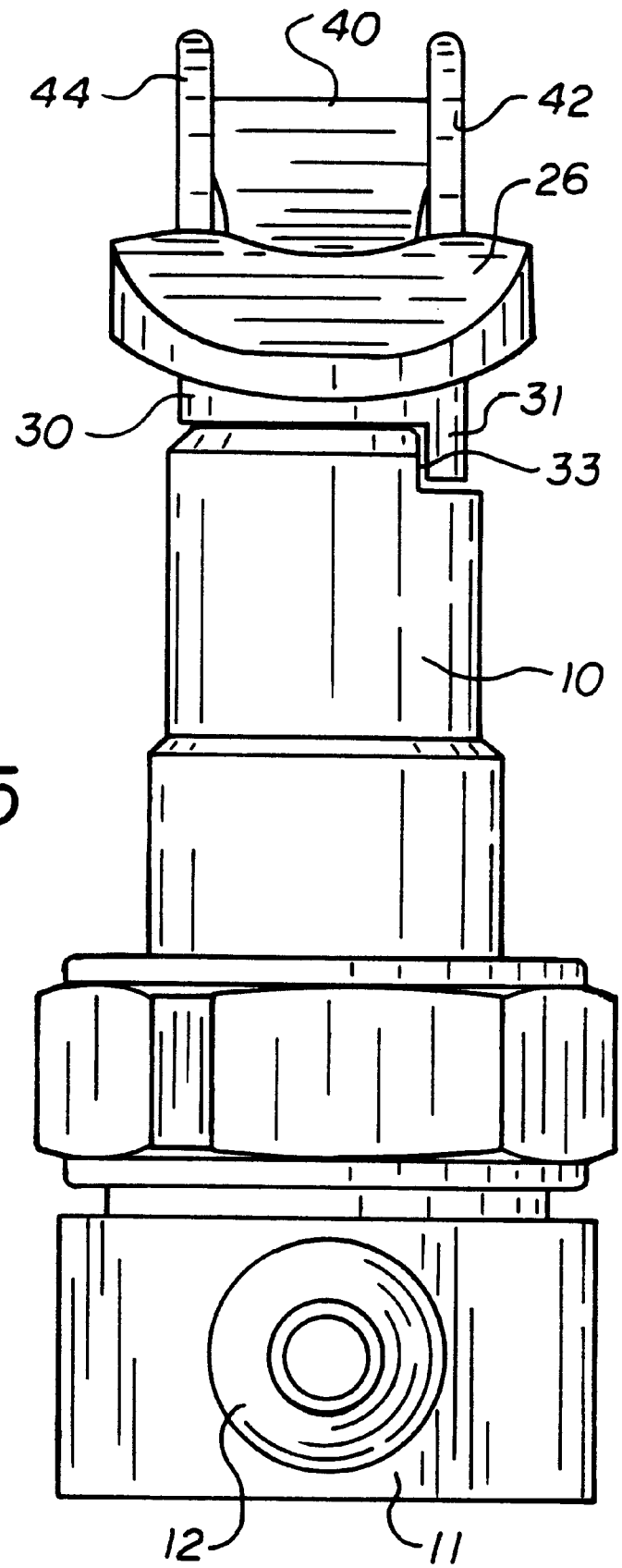
FIG. 5 is a back end view of the valve of FIG. 2.
Figure 6:
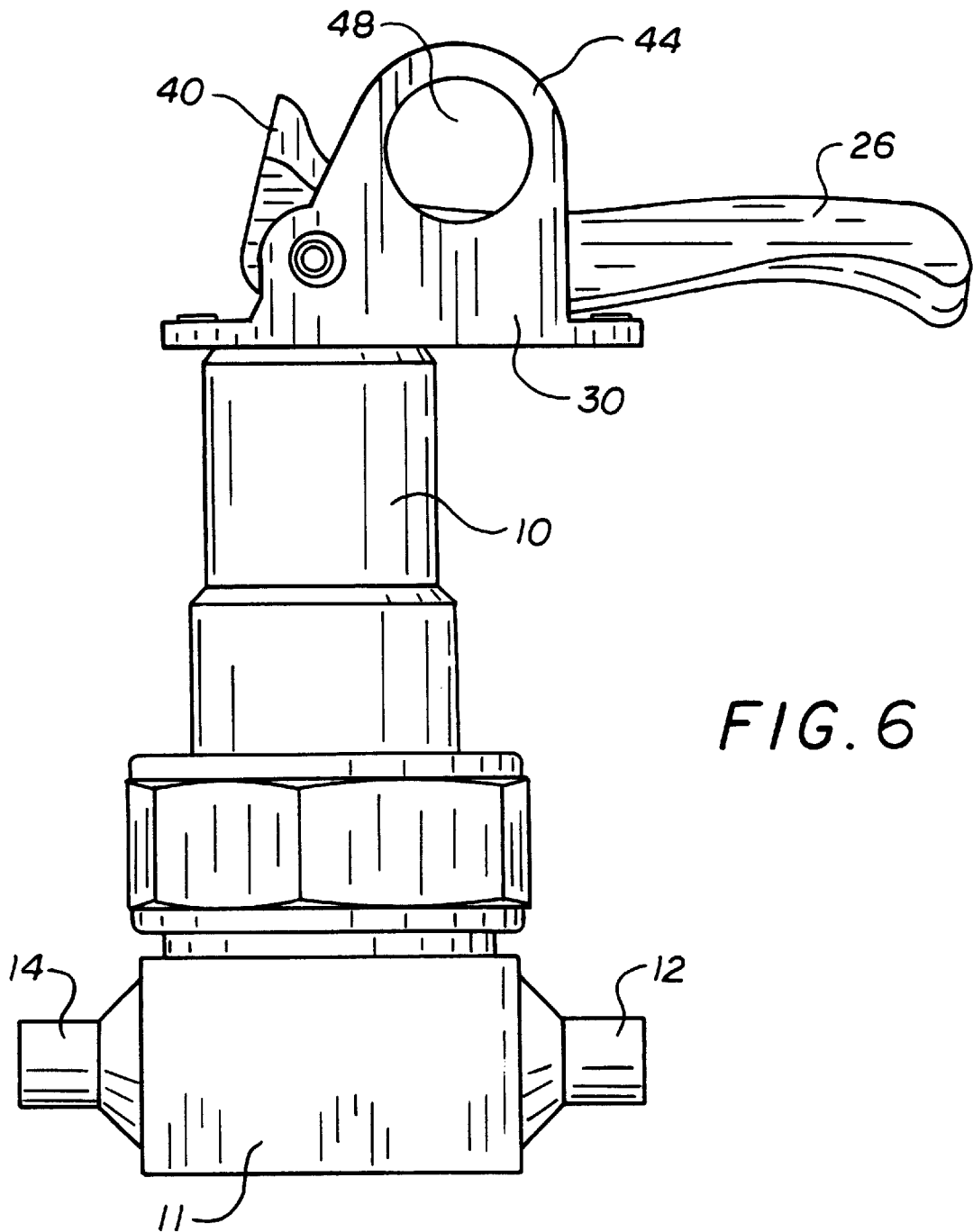
FIG. 6 is a right side view of the valve of FIG. 2.
Figure 8:
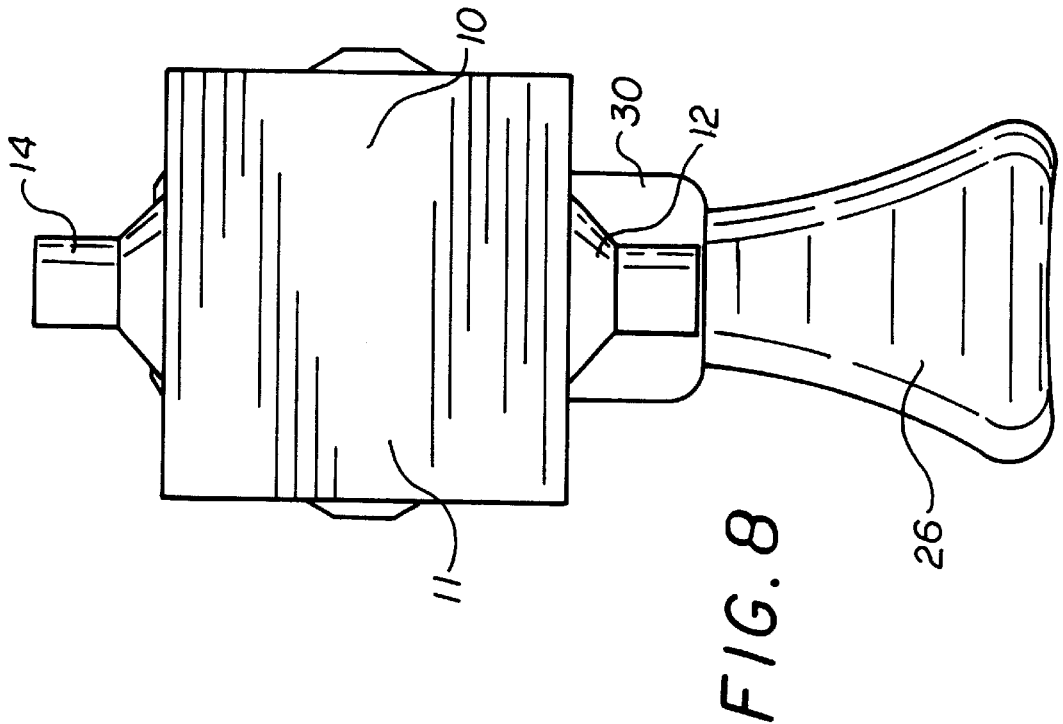
FIG. 8 is a bottom plan view of the valve of FIG. 2.

Still another feature provided by the valve is that the bracket 30 may be optionally keyed to the bonnet 20. In other words, the bracket cannot rotate relative to the bonnet which, in turn, prevents the handle 26 from being rotated in a radial plane. In a preferred manner of coupling the bracket to the bonnet, the bracket 30 has a downwardly-extending flange 31, as best shown in FIG. 4. The downwardly-extending flange 31 is received in cut-out 33 in the bonnet 20. Because the downwardly-extending flange 31 is captured within the cut-out 33, the bracket is prevented from rotating relative to the bonnet. The handle 26 is received in the bracket 30 which thereby limits the rotation of the handle 26. It is to be understood that a variety of other methods and arrangements may be used for coupling the bracket to the bonnet without departing from the scope of the invention. In one embodiment, the rotation of the handle is limited, therefore, to 90° within a vertical plane. However, it is also within the scope of the invention to have a valve wherein the bracket is not coupled to the bonnet. In this manner, the bracket and handle may radially rotated relative the bonnet.

Figure 9:
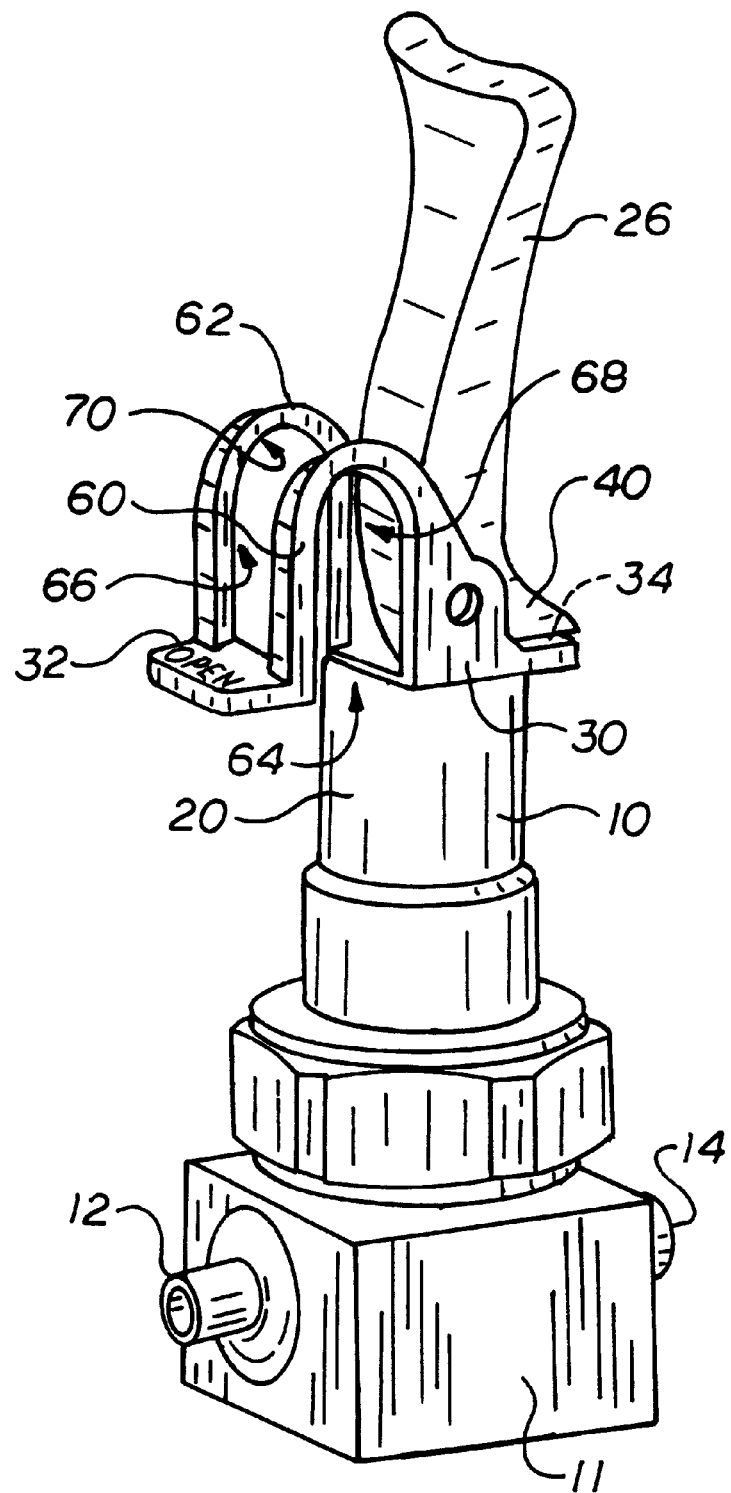
FIG. 9 is a perspective view of an alternate embodiment of the valve of the present invention, shown in the open position.
Figure 14:
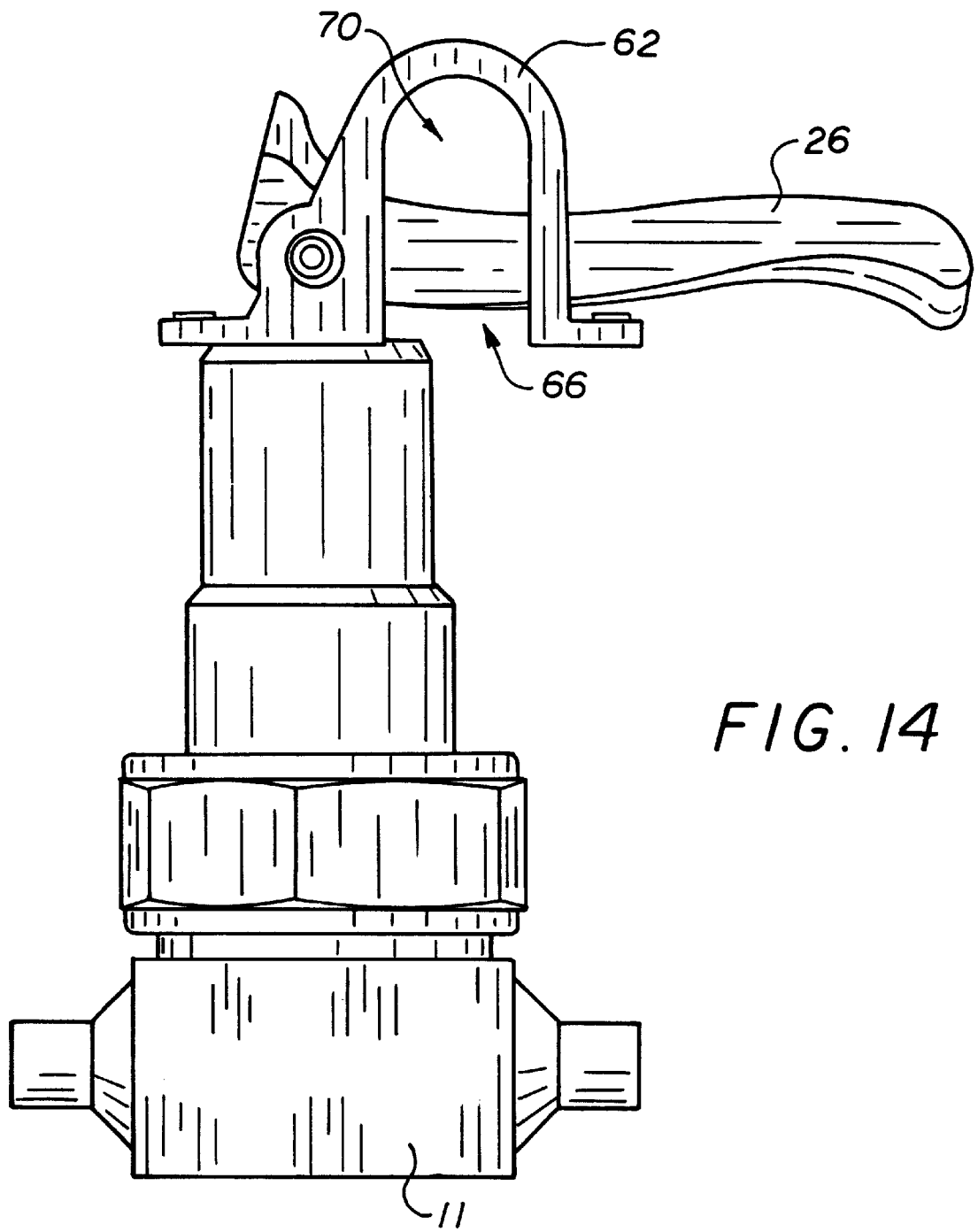
FIG. 14 is a right side view of the valve of FIG. 10.
Figure 16:
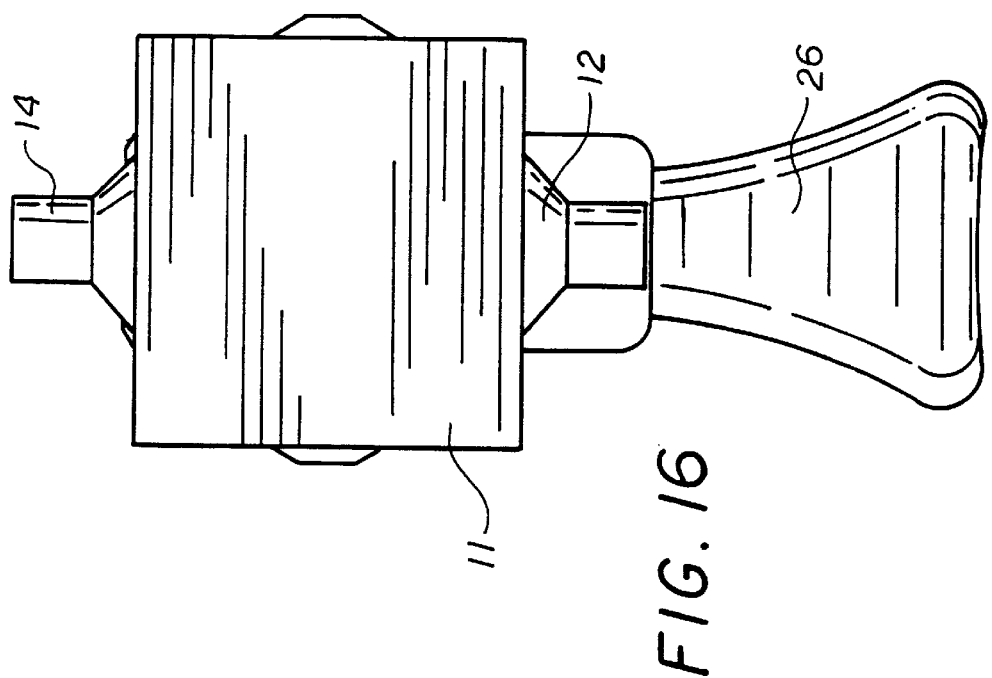
FIG. 16 is a bottom view of the valve of FIG. 10.
Figure 15:
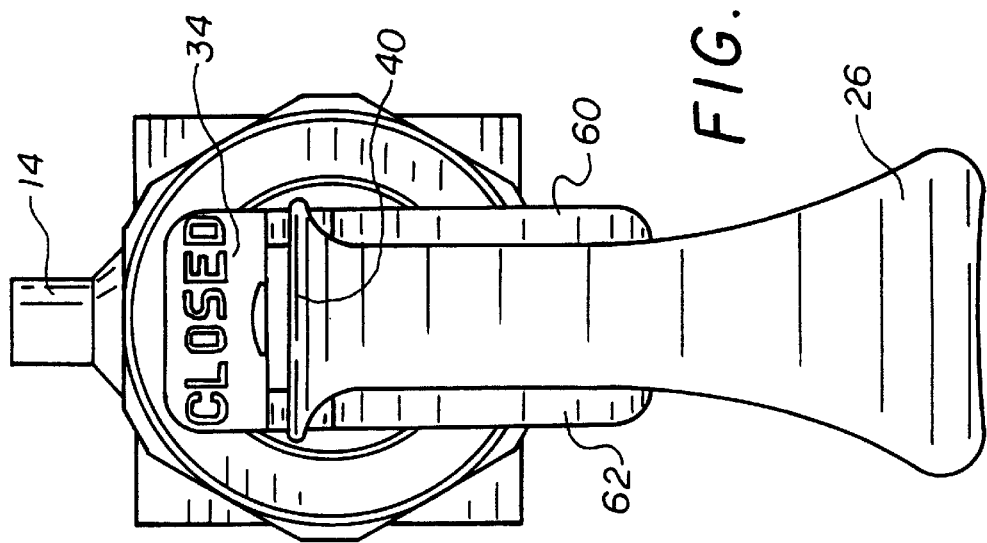
FIG. 15 is a top view of the valve of FIG. 10.

There is an increasing demand for valves which can be locked in the first position, such as the closed position, but cannot be locked in the other position, such as the open position. Accordingly, in alternate embodiment of the invention, shown in FIGS. 9–16, handle 26 can be locked in the closed position but not the open position. As shown in FIG. 9, the spaced flanges 42, 44 of the embodiment of FIGS. 1–8 are replaced with a pair of generally "U" shaped flanges 60, 62. The flanges 60, 62 are shaped to receive a lock 50 (FIG. 10) or other locking member when the handle 26 is in the closed position, but the flanges do not retain the lock 50 when the handle 26 is in the open position. Each flange 60, 62 is coupled to the bracket or member 30, and is generally shaped as an inverted "U". Each flange 60, 62 further has a cut-out 64, 66, each cut-out having an upper locking portion 68 (FIG. 11), 70 (FIG. 14). The flanges 60, 62 are spaced apart a sufficient distance so as to receive the actuating handle 26 therebetween. The open indicia 32 and closed indicia 34 are located on the bracket 30.

Figure 10:
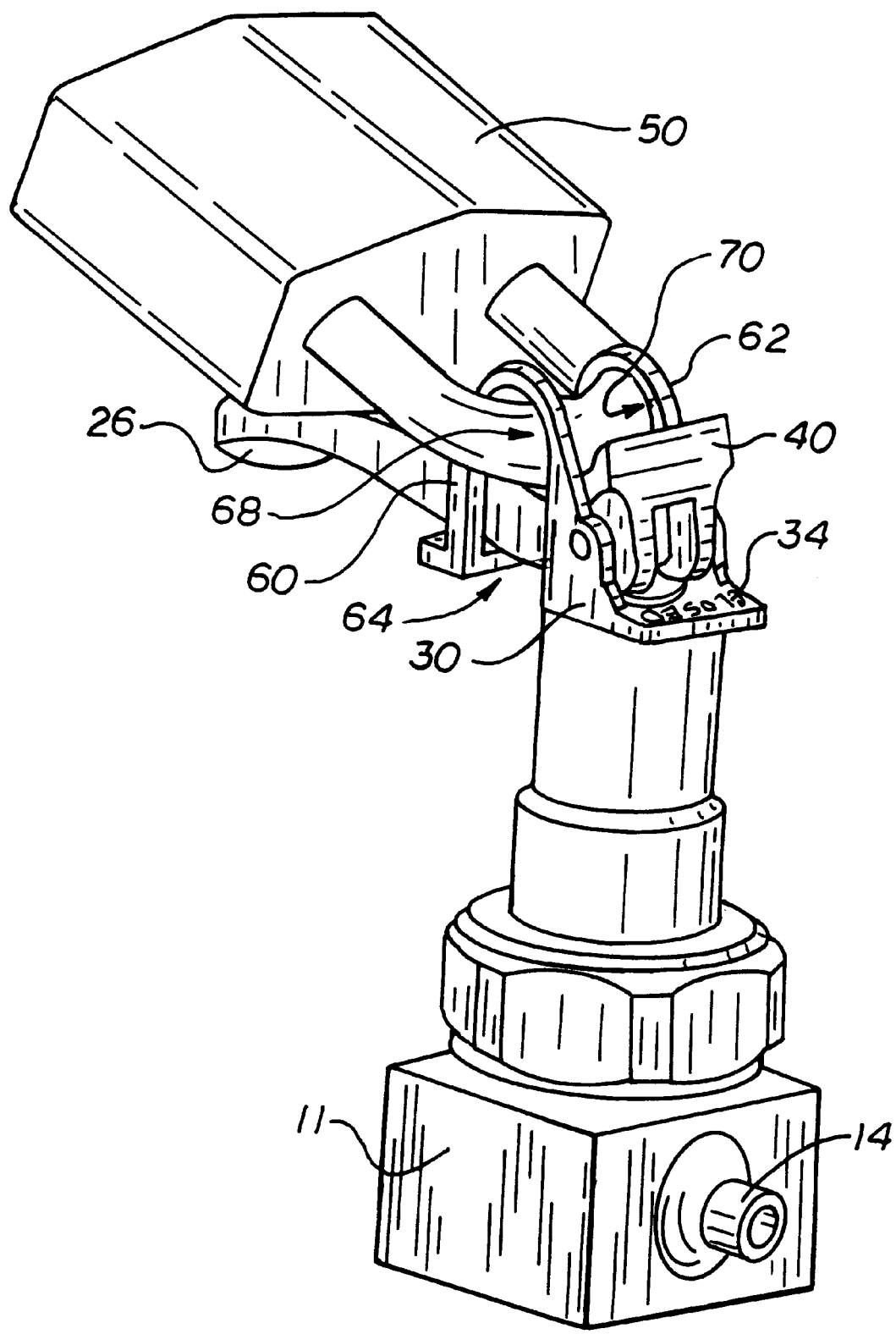
FIG. 10 is a perspective view of the valve of FIG. 9, shown locked in the closed position with a padlock.
Figure 11:
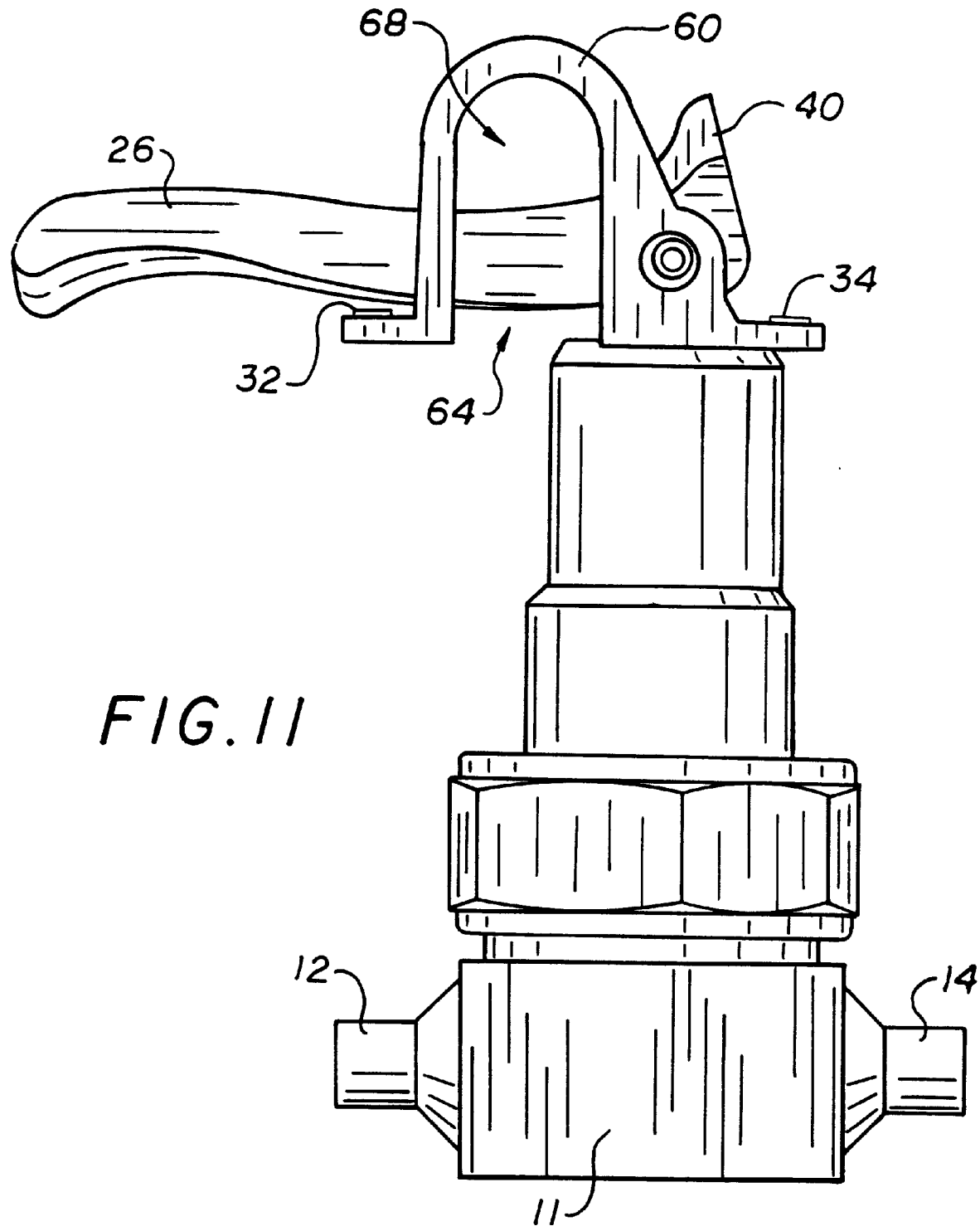
FIG. 11 is a left side view of the valve of FIG. 10.
Figure 12:
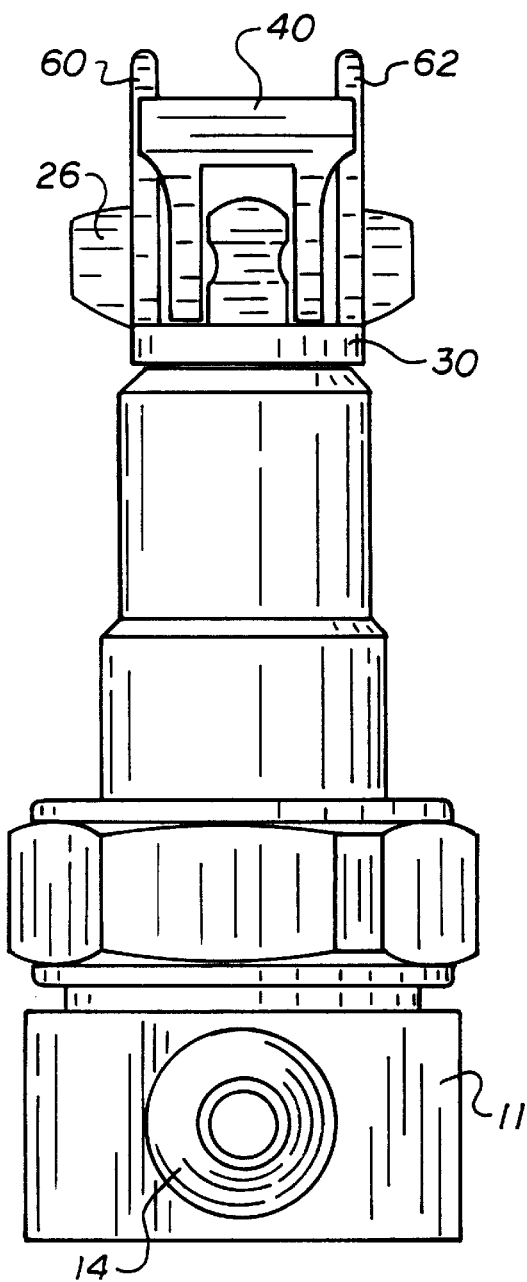
FIG. 12 is a front end view of the valve of FIG. 10.
Figure 13:
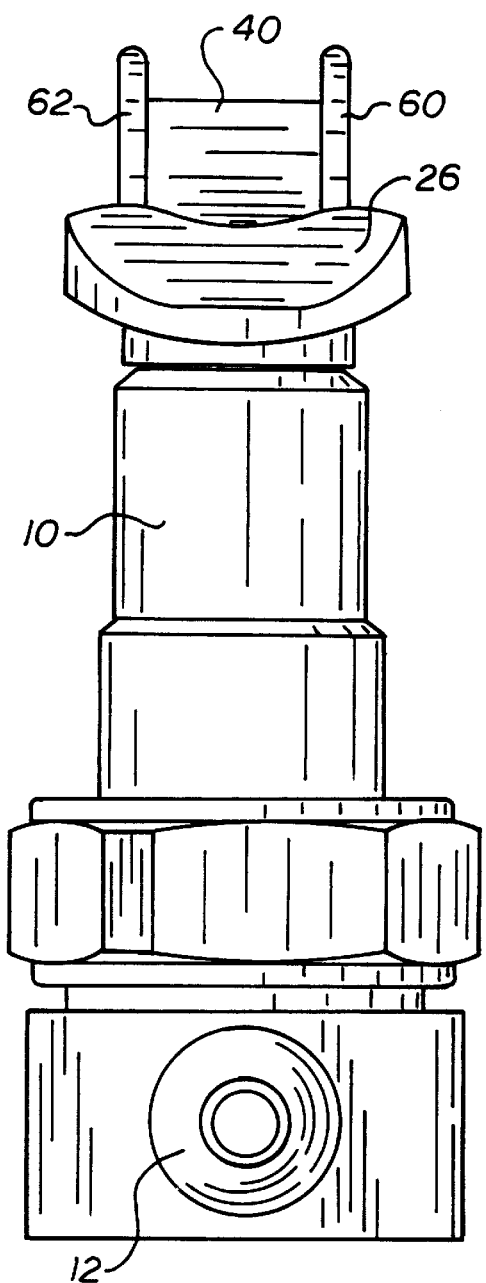
FIG. 13 is a back end view of the valve of FIG. 10.

When the actuating handle 26 is in the closed position, as shown in FIG. 10, the open indicia 32 is covered and the closed indicia 34 is visible. A padlock 50 may be passed through the locking portions 68, 70 of the cut-outs 64, 66. In this manner, the padlock 50 is retained between the handle 26 and the flanges 60, 62, thereby preventing axial rotation of the actuating handle 26. In contrast, when the actuating handle is in the open position, as shown in FIG. 9, there is no support below the flanges 60, 62, for the locking member 50. Accordingly, the locking member cannot be retained in the bracket 30, and there is no impediment to the rotation of the handle 26 to the closed position.

The preferred form of the valve has been described above. However, with the present disclosure in mind it is believed that obvious alterations to the preferred embodiments, to achieve comparable features and advantages in other assemblies, will become apparent to those of ordinary skill in the art.

We claim:

1. A manually actuated valve comprising:
   a handle rotatable about a pivot axis between a first position and a second position, said handle controlling operation of the valve; and
   a member for receiving a retainer along a second axis that is generally parallel with said pivot axis, said retainer substantially maintaining said handle in at least one of said first position or second position, said member being stationary relative said pivot axis during rotation of said handle about the pivot axis, said member and handle being mounted to prevent substantial relative rotation therebetween other than rotation of said handle about said pivot axis.

2. The valve of claim 1 wherein said member is shaped to receive said retainer such that said retainer maintains said handle in both said first position and said second position.

3. The valve of claim 1 wherein said member is shaped such that said retainer can be received in said member to maintain said handle only in said first position.

4. The valve of claim 1 wherein said member is coupled to said casing so as to prevent relative radial rotation therebetween.

5. The valve of claim 4 wherein said member receives said handle so as to prevent radial rotation of said handle relative said valve casing.

6. The valve of claim 1 further comprising an open indicia on said member wherein said open indicia is visible when said actuator is in said open position, and wherein said open indicia is not visible when said actuator is in said closed position.

7. The valve of claim 1 further comprising a closed indicia on said member wherein said closed indicia is visible when said actuator is in said closed position and wherein said closed indicia is not visible when said actuator is in said open position.

8. The valve of claim 1 wherein said handle is rotatable in a vertical plane from said first position to said second position to move said actuator from said closed position to said open position, and wherein said retainer impedes said handle from moving from said first position to said second position or from said second position to said first position.

9. The valve of claim 1 wherein said handle is generally horizontal when said actuator is in said closed position and said handle is generally vertical when said actuator is in said open position.

10. The valve of claim 1 wherein said member includes a pair of spaced flanges on either side of said handle, each flange having an opening formed therein to receive said retainer.

11. The valve of claim 10 wherein said opening is shaped to receive and retain said retainer.

12. The valve of claim 1 wherein said member includes a pair of spaced flanges on either side of said handle, each flange having a cut-out formed therein, each cut-out having a locking portion extending above said handle when said handle is in said first position.

13. The valve of claim 12 wherein each flange is generally shaped as an inverted "U" such that said retainer is not retained in said member when said handle is in said second position.

14. The valve of claim 1 further comprising a retainer.

15. The valve of claim 14 wherein said retainer is a padlock.

16. The valve of claim 1 wherein said actuator engages a diaphragm which blocks communication between said inlet and said outlet when said actuator is in said closed position.

17. The valve of claim 1 wherein said member prevents said substantial relative rotation by mechanically impeding the rotation of said handle relative said member other than rotation of said handle about said pivot axis, and wherein said retainer is not coupled to said handle.

18. The valve of claim 1 wherein said member is rigidly attached to said valve casing near said handle.

19. The valve of claim 1 wherein said member is shaped to receive said retainer in substantially the same position when said handle is in said first position or in said second position.

20. A manually actuated valve comprising:
   a handle rotatable about a pivot axis between a first position and a second position, said handle controlling operation of the valve; and a member for receiving a retainer along a second axis that is generally parallel with said pivot axis, said retainer when installed along said second axis maintaining said handle substantially in position for both said first and second handle positions, said member and handle being mounted to prevent substantial relative rotation therebetween other than rotation of said handle about said pivot axis.

21. The manually actuated valve of claim 20 wherein said first position of said handle corresponds to said closed position of said actuator, and wherein said member is shaped to receive said retainer such that said retainer can only maintain said handle in said first position.

22. A manually actuated valve comprising:

a handle rotatable about a pivot axis between a first position and a second position, said handle controlling operation of the valve; and a member which cooperates with said handle to provide a retainer-receiving space when said handle is in one of said first and second positions and not in the other, said retainer-receiving space receiving a retainer to substantially maintain said handle in said one position, said member and handle being mounted to prevent substantial relative rotation therebetween other than rotation of said handle about said pivot axis.

* * * * *